(12) United States Patent
Iizuka et al.

(10) Patent No.: US 9,791,183 B2
(45) Date of Patent: Oct. 17, 2017

(54) THERMAL RECTIFICATION DEVICE (71) Applicant: KABUSHIKI KAISHA TOYOTA CHUO KENKYUSHO, Nagakute-shi, Aichi-ken (JP)

(72) Inventors: Hideo Iizuka, Nagakute (JP); Shanhui Fan, Stanford, CA (US)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 493 days.

(21) Appl. No.: 14/391,307

(22) PCT Filed: Apr. 16, 2013

(86) PCT No.: PCT/JP2013/061704
§ 371 (c)(1),
(2) Date: Oct. 8, 2014

(87) PCT Pub. No.: WO2013/157656
PCT Pub. Date: Oct. 24, 2013

(65) Prior Publication Data
US 2015/0082810 A1     Mar. 26, 2015

(30) Foreign Application Priority Data

Apr. 20, 2012   (JP) .................................. 2012-096898

(51) Int. Cl.
*F25B 21/00*     (2006.01)
*B82Y 30/00*     (2011.01)
(Continued)

(52) U.S. Cl.
CPC .............. *F25B 21/00* (2013.01); *B82Y 30/00* (2013.01); *F28F 99/00* (2013.01);
(Continued)

(58) Field of Classification Search
CPC ...... B82Y 30/00; F25B 21/00; F25B 2321/00; F28F 13/18; F28F 21/04; F28F 2255/20; F28F 99/00
See application file for complete search history.

(56) References Cited

U.S. PATENT DOCUMENTS

| 2005/0247337 | A1 | 11/2005 | Chen et al. | |
| 2010/0167004 | A1* | 7/2010 | Chang | F28F 13/00 165/277 |
| 2012/0079833 | A1* | 4/2012 | Rowe | F28F 13/00 62/3.1 |

OTHER PUBLICATIONS

Basu, S, et al., "Near-Field Radiative Transfer Based Thermal Rectification Using Doped Silicon," Applied Physics Letters, pp. 113106-1 to 113106-3, vol. 98, (2011).*

(Continued)

*Primary Examiner* — Len Tran
*Assistant Examiner* — Hans Weiland
(74) *Attorney, Agent, or Firm* — Oliff PLC (57) ABSTRACT

The first and second media are coupled via evanescent waves generated by surface phonon polaritons thermally excited on surfaces of the first and second media. First and second media made of the same material are disposed with a gap formed between for cutting off thermal conduction and the heat transfer between them is performed via the thermally excited evanescent waves. A third medium is provided on a surface of the first medium on a side toward the second medium. Heat flux flows from the second medium to the first medium in a first state wherein the second medium has a first temperature $T_H$ and the first medium has a second temperature $T_L$ lower than the $T_H$ differ in intensity from heat flux which flows from the first to the second medium in a second state wherein the first medium has the $T_H$ and the second medium has the $T_L$.

20 Claims, 5 Drawing Sheets

(51) Int. Cl.
*F28F 99/00* (2006.01)
*F28F 13/18* (2006.01)
*F28F 21/04* (2006.01)
*F28D 20/00* (2006.01)

(52) U.S. Cl.
CPC .......... *F25B 2321/00* (2013.01); *F28D 20/00* (2013.01); *F28F 13/18* (2013.01); *F28F 21/04* (2013.01); *F28F 2255/20* (2013.01)

(56) References Cited

OTHER PUBLICATIONS

Polder, D. et al., "Theory of Radiative Heat Transfer Between Closely Spaced Bodies," *Physical Review B*, (Nov. 15, 1971), pp. 3303-3314, vol. 4, No. 10.
Basu S., et al., "Review of Near-Field Thermal Radiation and its Application to Energy Conversion," *International Journal of Energy Research*, pp. 1203-1232, (2009), vol. 33.
Otey, C.R., et al, "Thermal Rectification Through Vacuum," *Physical Review Letters*, pp. 154031-1 to 154031-4, vol. 104, No. 15, (2010).
International Search Report issued in International Patent Application No. PCT/JP2013/061704 dated Sep. 20, 2013.
Written Opinion of the International Search Authority issued in International Patent Application No. PCT/JP2013/061704 dated Sep. 20, 2013.

* cited by examiner

1:SiC, #2:SiC, #3:a-Si

THERMAL RECTIFICATION DEVICE

TECHNICAL FIELD

The present invention relates to a device for controlling heat flux. More particularly, the invention relates to a device having a rectification characteristic for heat flow such that an intensive heat transfer is enabled only when one medium becomes higher in temperature than the other medium.

BACKGROUND ART

The publication, D. Polder and M. Van Hove, "Theory of radiative heat transfer between closely spaced bodies," Physical Review B 4, 3303 (1971), discusses heat transfer in the case where two media are disposed via a heat nonconductive medium; i.e., a vacuum layer or an air layer, having a thickness much less than the wavelength of thermally radiated electromagnetic waves; specifically, a thickness of several hundred nm or less. In this case, heat flux via evanescent waves is several orders of intensity larger than heat flux via blackbody radiation.

The publication, S. Basu, Z. M. Zhang, and C. J. Fu, "Review of near-field thermal radiation and its application to energy conversion," International Journal of Energy Research 33, 1203-1232 (2009), discloses that when SiC plates are disposed with a vacuum gap of 1 nm therebetween, heat flux via evanescent waves is about five orders of intensity larger than heat flux via blackbody radiation. This phenomenon is also called phonon tunneling. The publication also discloses that the real part of the relative permittivity of Si doped with n-type impurities at a high concentration of $10^{19}/cm^3$ or higher varies from 0 to −230 as the angular frequency reduces from $10^{15}$ to $10^{13}$.

The publication, C. R. Otey, W. T. Lau, and S. Fan, "Thermal rectification through vacuum," Physical Review Letters 104, 154301 (2010), discloses that when a thick plate made of SiC-3C and a thick plate made of SiC-6H are disposed with a vacuum gap having a thickness d therebetween, heat flux which flows from the SiC-3C plate maintained at a high temperature to the SiC-6H plate maintained at a low temperature is greater in intensity than heat flux which flows from the SiC-6H plate maintained at a high temperature to the SiC-3C plate maintained at a low temperature. That is, the publication discloses that thermal rectification is achieved. Thermal rectification is achieved for the following reason. Because of difference in temperature dependence of permittivity, when SiC-3C has a temperature of 500K, and SiC-6H has a temperature of 300K, the surface phonon polariton resonance frequency bands of SiC-3C and SiC-6H match over a wide band width; thus, large thermal energy transfers from SiC-3C to SiC-6H. The direction of this heat flow is called the forward direction. When SiC-3C has a temperature of 300K, and SiC-6H has a temperature of 500K, the surface phonon polariton resonance frequency bands of SiC-3C and SiC-6H match over a narrow range; thus, thermal energy that transfers is small. The direction of this heat flow is called the reverse direction.

Figure 5:
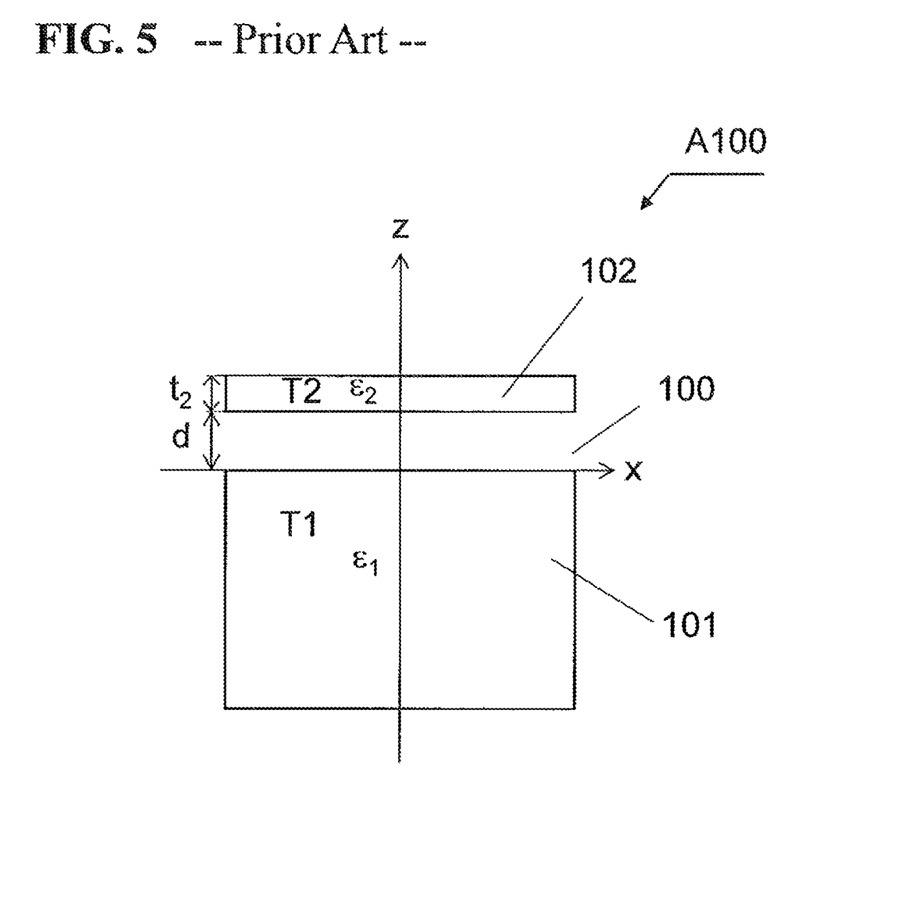
FIG. 5 is a view showing the configuration of a conventional thermal rectification device.

FIG. 5 shows the configuration of a thermal rectification system described in the publication, S. Basu and M. Francoeur, "Near-field radiative transfer based thermal rectification using doped silicon," Applied Physics Letters 98, 113106 (2011). In FIG. 5, one medium 102 has a thickness of 10 nm, whereas the other medium 101 has an infinite thickness. That is, the medium 101 is a semiinfinite medium. An air gap 100 between the medium 102 and the medium 101 is 10 nm. The medium 101 is Si doped with n-type impurities at a concentration of $10^{21}/cm^3$, and the medium 102 is Si doped with n-type impurities at a concentration of $10^{18}/cm^3$. When the medium 102 has a temperature T2 of 400K, and the medium 101 has a temperature T1 of 300K, heat flux which flows from the medium 102 to the medium 101 is large in intensity. By contrast, when the medium 102 has a temperature T2 of 300K, and the medium 101 has a temperature T1 of 400K, heat flux which flows from the medium 101 to the medium 102 is small in intensity. When the size d of the air gap 100 falls within a range of 1 nm to 50 nm, a rectification coefficient of 0.5 is obtained for the temperature difference between 300K and 400K.

SUMMARY OF INVENTION

Technical Problem

However, in the thermal rectification system described in the last-mentioned publication, it is not easy to fix a silicon film (medium 102) having a thickness $t_2$ of 10 nm with a distance (gap) d of 10 nm provided between the medium 102 and the medium 101. In order to achieve thermal rectification in the configuration where two media are disposed with an air layer or a vacuum layer therebetween, it is necessary to find two materials which have different relative permittivities whose real parts are −1 or less as measured in a working temperature range and a frequency band of the evanescent waves when heat transfer is performed via the evanescent waves. This poses an impediment to implementation of a thermal rectification device.

Thus, in order to improve the degree of freedom of design, desirably, even when two media are of the same material, thermal rectification is achieved.

The present invention has been conceived to solve the above problem, and an object of the invention is to provide a device having a rectification characteristic with respect to heat flow between two media of the same material, for facilitating fabrication of a thermal rectification device.

Solution to Problem

To achieve the above object, the present invention provides a thermal rectification device comprising a first medium and a second medium. The first and second media are coupled via evanescent waves generated by surface phonon polaritons thermally excited on surfaces of the first and second media. The first and second media are disposed with a gap formed therebetween for cutting off thermal conduction therebetween. Heat transfer between the first and second media is performed mainly via the thermally excited evanescent waves. In the thermal rectification device, the first medium and the second medium are of the same material; a third medium is provided on a surface of the first medium on a side toward the second medium; and heat flux which flows from the second medium to the first medium in a first state in which the second medium has a first temperature $T_H$ and the first medium has a second temperature $T_L$ lower than the first temperature $T_H$ differs in intensity from heat flux which flows from the first medium to the second medium in a second state in which the first medium has the first temperature $T_H$ and the second medium has the second temperature $T_L$.

On a surface of a medium having a negative relative permittivity and placed in air or a vacuum, surface phonon polaritons are excited, whereby evanescent waves are generated. The present invention is characterized in that by means of the third medium being provided on a surface of the first medium, a resonance frequency band of surface phonon polaritons thermally excited at the interface between the first medium and the third medium and a resonance frequency band of surface phonon polaritons thermally excited on a surface of the second medium overlap to a large extent under a predetermined temperature-difference condition. In other words, even when the first medium and the second medium are of the same material, the material and thickness of the third medium are selected so as to provide such a characteristic.

The gap is low in thermal conduction between the first medium and the second medium. For example, the gap can be formed from a vacuum, air, or other thermally insulative material. In order to maintain the gap, a spacer formed from nanoparticles of a thermally insulative material may be present in a portion of the gap.

In the present invention, a fourth medium may be provided on a surface of the second medium on a side toward the first medium. In this case, by means of different materials being used to form the third medium and the fourth medium such that the third medium and the fourth medium differ in a frequency characteristic and temperature characteristic of relative permittivity, the forward direction of heat flux can be set to any direction.

In the present invention, the third medium may have a relative permittivity and a thickness such that, in the first state, there exists a wide first frequency range in which the resonance frequency of surface phonon polaritons thermally excited at the interface between the first medium and the third medium coincides with the resonance frequency of surface phonon polaritons thermally excited on the surface of the second medium on the side toward the first medium, and, in the second state, there does not exist or does exist a second frequency range which is narrower than the first frequency range and in which the resonance frequency of surface phonon polaritons thermally excited at the interface between the first medium and the third medium coincides with the resonance frequency of surface phonon polaritons thermally excited on the surface of the second medium.

In the state in which the temperature of the second medium is higher than that of the first medium, resonance can be established between surface phonon polaritons thermally excited at the interface between the first medium and the third medium and surface phonon polaritons thermally excited on the surface of the second medium. Therefore, heat flux which flows from the second medium to the first medium increases in intensity, thereby yielding a thermal rectification device whose forward direction of heat flux is from the second medium to the first medium. In the state in which the temperature of the second medium is lower than that of the first medium, no resonance is established between the first medium and the second medium, so that heat flux which flows in the reverse direction; i.e., from the first medium to the second medium, is small in intensity. The expression "there exists a frequency band in which the resonance frequencies coincide" means that the resonance frequencies coincide at least in a portion of the respective frequency bands of thermally excited phonons. Of course, the resonance frequencies may coincide over the entire frequency band.

In the case where the fourth medium is provided, desirably, the third medium and the fourth medium have a relative permittivity and a thickness, respectively, such that, in the first state, there exists a wide first frequency range in which the resonance frequency of surface phonon polaritons thermally excited at the interface between the first medium and the third medium coincides with the resonance frequency of surface phonon polaritons thermally excited at the interface between the second medium and the fourth medium, and, in the second state, there does not exist or does exist a second frequency range which is narrower than the first frequency range and in which the resonance frequency of surface phonon polaritons thermally excited at the interface between the first medium and the third medium coincides with the resonance frequency of surface phonon polaritons thermally excited at the interface between the second medium and the fourth medium.

Resonance is established between surface phonon polaritons thermally excited at the interface between the first medium and the third medium and surface phonon polaritons thermally excited at the interface between the second medium and the fourth medium, under the temperature-difference condition of the first state. Establishment of resonance yields a thermal rectification device whose forward direction of heat flux is from the high-temperature medium to the low-temperature medium.

Heat flux which flows from the second medium to the first medium when the temperature of the second medium is higher than that of the first medium can be rendered larger in intensity than heat flux which flows from the first medium to the second medium when the temperature of the second medium is lower than that of the first medium.

In the present invention, desirably, the gap between the first medium and the second medium is 300 nm or less. The gap of such a size allows surface phonon polaritons thermally generated on the two interfaces to resonate and tunnel therethrough. When the gap has such a size that is much less than a wavelength of 10.6 μm of evanescent waves generated through thermal excitation of surface phonon polaritons, the gap allows efficient coupling of evanescent waves. The gap is more desirably 200 nm or less, most desirably 100 nm or less. A gap of 50 nm or less is also desirable.

The relative permittivities of the first and second media have a real part of −1 or less as measured in a working temperature range and a frequency band of the evanescent waves when heat transfer is performed via the evanescent waves. In this case, surface phonon polaritons can be thermally excited at the interface between media (the gap is also considered to be a medium).

Desirably, the first medium and the second medium are at least one of silicon carbide (SiC), silicon dioxide ($SiO_2$), and silicon (Si) doped with impurities. These materials have relative permittivities whose real parts are −1 or less as measured in a working temperature range and a frequency band of thermally excited surface phonon polaritons. In the case of SiC, one wavelength band (surface phonon polariton frequency band) allows heat transfer. In the case of $SiO_2$, two wavelength bands allow heat transfer.

Desirably, when a direction in which heat flux of high intensity flows is defined as a forward direction and a direction in which heat flux of low intensity flows is defined as a reverse direction, the third medium has such a relative permittivity and thickness as to maximize heat flux of the forward direction. In this case, the rectification coefficient can be increased.

Desirably, when a direction in which heat flux of high intensity flows is defined as a forward direction and a direction in which heat flux of low intensity flows is defined as a reverse direction, the fourth medium has such a relative permittivity and thickness as to maximize heat flux of the forward direction. In this case, the rectification coefficient can be increased.

In the present invention, desirably, a thickness $t_3$ and a relative permittivity $\epsilon_3$ of the third medium satisfy

[Math. 1]

$$t_3 = \frac{1}{2k_m} \ln \frac{(\varepsilon_3 - 1)(\varepsilon_3^2 - |\varepsilon_1|^2)}{(\varepsilon_3 + 1)|\varepsilon_3 + \varepsilon_1|^2} \quad (1)$$

where $\varepsilon_1$ is a relative permittivity of the first medium, $k_m$ is $40k_0$ to $50k_0$, $k_0 = 2\pi/\lambda_0$, and $\lambda_0$ is a wavelength (resonance wavelength) of evanescent waves which maximizes heat flux in a forward direction, which is a direction in which heat flux of higher intensity flows as compared with that in the opposite direction. $\lambda_0$ is a function of the temperature of the first medium and the second medium. For example, $\lambda_0 = 10.6$ μm. In this case, forward heat flux can be maximized.

In the present invention, desirably, the third medium is amorphous silicon and has a thickness $t_3$ of 1 nm to 2 nm. The thickness $t_3$ relates to temperature and the relative permittivity $\varepsilon_3$; however, a thickness $t_3$ of 0.5 nm to 1.5 nm is a desirable range. Also, desirably, the third medium is a material having a relative permittivity of 1.5 to 2.5 and has a thickness $t_3$ of 5 nm to 20 nm. Under these conditions, in a working temperature range, surface phonon polaritons thermally excited on the two interfaces can resonate, thereby increasing forward heat flux and reducing reverse heat flux and thus the increasing rectification coefficient.

The third medium and the fourth medium can be at least one selected from the group consisting of barium fluoride ($BaF_2$), strontium fluoride ($SrF_2$), lead fluoride ($PbF_2$), calcium fluoride ($CaF_2$), rubidium bromide (RbBr), cesium bromide (CsBr), cesium chloride (CsCl), potassium chloride (KCl), and sodium chloride (NaCl).

Advantageous Effects of Invention

According to the present invention, even when the first medium and the second medium are of the same material, a thermal rectification characteristic can be obtained. Therefore, the fabrication of the thermal rectification device is facilitated. Also, through appropriate selection of material and conditions for the third medium, the working temperature range and the rectification characteristic of the thermal rectification device can be improved.

The inventors of the present invention derived Eq. (1) mentioned above. By use of Eq. (1), the relative permittivity $\varepsilon_3$ and thickness $t_3$ of the third medium can be readily determined. Therefore, the determination of characteristics of and the fabrication of the thermal rectification device are facilitated.

DESCRIPTION OF EMBODIMENTS

Embodiments of the present invention will next be described in detail with reference to the drawings. The following embodiments are mere examples, and the present invention is not limited thereto.

First Embodiment

Figure 1:
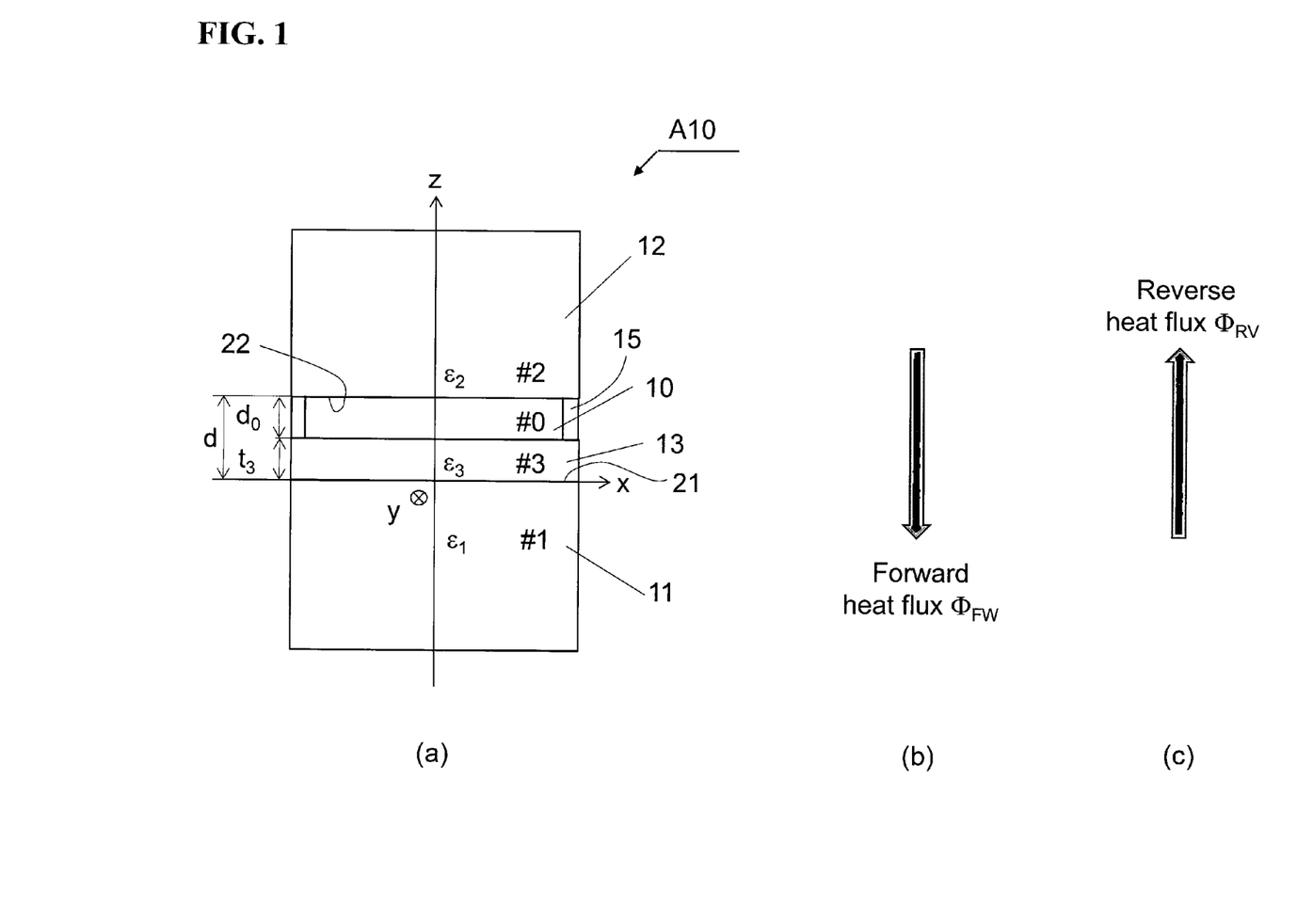
FIG. 1 is a view showing the configuration of a thermal rectification device according to a first embodiment of the present invention.

FIG. 1 shows, in (a), the configuration of a thermal control device A10 according to a first embodiment of the present invention. A first medium 11 and a second medium 12 are of silicon carbide. The first medium 11 and the second medium 12 are rectangular parallelepipeds whose square xy planes serve as main surfaces 21 and 22, respectively, and whose thicknesses extend in the z direction. As compared with the area of the xy plane, the thickness is sufficiently thick. The second medium 12 and a third medium 13 are disposed in parallel with each other with a gap 10 formed therebetween so as to separate them from each other by a distance $d_0$. The gap 10, which provides the fixed distance $d_0$, is formed by a thermally insulative spacer 15 having a square shape and provided around the main surface 21. The gap 10 is a vacuum layer, but may be an air layer. Also, a thermally insulative material having a sufficiently low thermal conductivity may exist in the entirety or a portion of the gap 10. The main surface 21 of the first medium 11 and the main surface 22 of the second medium 12 face each other with a distance (gap) d therebetween. The third medium 13 is coated on the main surface 21 of the first medium 11. The third medium 13 is of amorphous silicon.

Even when the first medium 11 and the second medium 12 are of the same material, by means of the third medium 13 of amorphous silicon being coated on the surface of the first medium 11, the permittivity of the first medium 11 can be equivalently controlled. Therefore, unidirectional heat flow can be obtained. Specifically, as shown in (b) of FIG. 1, when the temperature $T_2$ of the second medium 12 is maintained at 500K and the temperature $T_1$ of the first medium 11 is maintained at 300K, the resonance frequency of surface phonon polaritons thermally excited on the main surface 21 of the first medium 11 coincides with the resonance frequency of surface phonon polaritons thermally excited on the main surfaces 22 of the second medium 12, whereby heat flux of high intensity flows in the forward direction. On the contrary, as shown in (c) of FIG. 1, when the temperature $T_2$ of the second medium 12 is maintained at 300K and the temperature $T_1$ of the first medium 11 is maintained at 500K, heat flux is reversed. In this case, since the resonance frequency of surface phonon polaritons thermally excited on the main surface 21 of the first medium 11 does not coincide with the resonance frequency of surface phonon polaritons thermally excited on the main surfaces 22 of the second medium 12, the heat flux flowing in the reverse direction is sufficiently smaller in intensity than the heat flux flowing in the forward direction.

Thermal conduction components are p-polarization and s-polarization of evanescent waves and p-polarization and s-polarization of propagation waves (radiation waves). In the case where the first medium 11 and the second medium 12 face each other with a very small gap therebetween, heat flow is dominated by the p-polarization component of evanescent waves; therefore, attention is focused herein on p-polarization. With the second medium 12 having a high temperature and the first medium 11 having a low temperature, the Poynting vector of p-polarization of evanescent waves in the state in which the net heat flow is directed from the second medium 12 to the first medium 11 (forward temperature biased state) is expressed as follows, where $(\varepsilon_3)^{1/2}\omega/c<\beta$.

[Math. 2]

$$\langle S_{Forward}(\omega, \beta, T_L, T_H)\rangle \sim (\theta(\omega, T_H) - \theta(\omega, T_L)) \quad (2)$$

$$\int_{\sqrt{\varepsilon_3}\frac{\omega}{c}}^{+\infty} \frac{4\beta d\beta}{\pi^2}\left[\frac{\varepsilon_3\kappa_0\kappa_3}{(\varepsilon_3\kappa_0+\kappa_3)^2}\text{Im}(r_{31,p}(\omega, \beta, T_L))\right.$$

$$\left. \text{Im}(r_{02,p}(\omega, \beta, T_H))\frac{\exp(-2\kappa_3 t_3 - 2\kappa_0 d_0)}{|D_{ee}(\omega, \beta, T_L, T_H)|^2}\right]$$

[Math. 3]

$$\theta(\omega, T) = \frac{\hbar\omega}{\exp\left(\frac{\hbar\omega}{k_B T}\right) - 1} \quad (3)$$

[Math. 4]

$$D_{ee}(\omega, \beta, T_L, T_H) = 1 - r_{31,p}(\omega, \beta, T_L)r_{30,p}(\omega, \beta)\exp(-2\kappa_3 t_3) - \quad (4)$$
$$r_{03,p}(\omega, \beta)r_{02,p}(\omega, \beta, T_H)\exp(-2\kappa_0 d_0) -$$
$$r_{31,p}(\omega, \beta, T_L)r_{02,p}(\omega, \beta, T_H)\exp(-2\kappa_3 t_3 - 2\kappa_0 d_0)$$

[Math. 5]

$$\kappa_3 = \sqrt{\beta^2 - \varepsilon_3\left(\frac{\omega}{c}\right)^2} \quad \left(\sqrt{\varepsilon_3}\frac{\omega}{c} < \beta\right) \quad (5)$$

[Math. 6]

$$\kappa_0 = \sqrt{\beta^2 - \left(\frac{\omega}{c}\right)^2} \quad \left(\frac{\omega}{c} < \beta\right) \quad (6)$$

Variables $T_1$ and $T_2$ of $S_{Forward}(\omega,\beta,T_1,T_2)$ and $S_{Reverse}(\omega,\beta,T_1,T_2)$ are the temperatures of the first medium 11 and the second medium 12, respectively. Subscripts 1, 2, 3, and 0 denote the first medium 11, the second medium 12, the third medium 13, and the gap 10, respectively. Also, k is the wavenumber; $\beta$ is the wavenumber in the xy plane; $r_{ij,p}$ is the Fresnel coefficient of p-polarization at the interface between a medium i and a medium j; and < > denotes an ensemble average. Silicon carbide varies in permittivity with temperature and frequency. When the temperature $T_H$ is 500K and the temperature $T_L$ is 300K, the resonance wavelength, at which the forward heat flux is maximized, is 10.6 μm. In the vicinity of the resonance wavelength of 10.6 μm, the permittivity of amorphous silicon is 3.742 (no loss).

With the first medium 11 having a high temperature and the second medium 12 having a low temperature, the Poynting vector of p-polarization of evanescent waves in the state in which the net heat flux is directed from the first medium 11 to the second medium 12 (reverse temperature biased state) is expressed as follows, where $(\varepsilon_3)^{1/2}\omega/c<\beta$.

[Math. 7]

$$\langle S_{Reverse}(\omega, \beta, T_H, T_L)\rangle \sim (\theta(\omega, T_H) - \theta(\omega, T_L)) \quad (7)$$

$$\int_{\sqrt{\varepsilon_3}\frac{\omega}{c}}^{+\infty} \frac{4\beta d\beta}{\pi^2}\left[\frac{\varepsilon_3\kappa_0\kappa_3}{(\varepsilon_3\kappa_0+\kappa_3)^2}\text{Im}(r_{31,p}(\omega, \beta, T_H))\right.$$

$$\left. \text{Im}(r_{02,p}(\omega, \beta, T_L))\frac{\exp(-2\kappa_3 t_3 - 2\kappa_0 d_0)}{|D_{ee}(\omega, \beta, T_H, T_L)|^2}\right]$$

Therefore, the forward heat flux and the reverse heat flux are given by the following Eqs. (8) and (9), respectively.

[Math. 8]

$$\phi_{Forward}=\int_0^{+\infty}<S_{Forward}(\omega,\beta,T_L,T_H)>d\omega \quad (8)$$

[Math. 9]

$$\phi_{Reverse}=\int_0^{+\infty}<S_{Reverse}(\omega,\beta,T_H,T_L)>d\omega \quad (9)$$

Figure 2A:
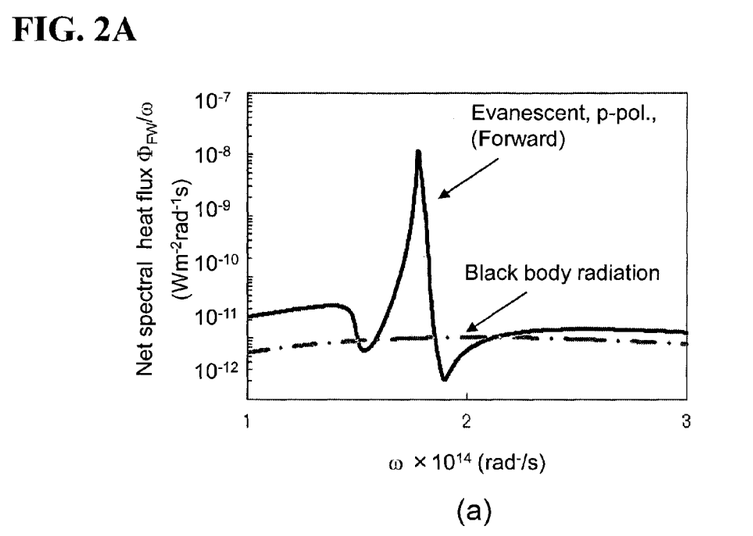
FIG. 2A is a characteristic diagram showing the forward heat flux spectrum of the heat rectification device of the first embodiment and the blackbody radiation spectrum.

FIG. 2A compares the forward heat flux spectrum of the thermal rectification device of the first embodiment with that of blackbody radiation. The distance d between the first medium 11 and the second medium 12 was set to 100 nm, and the thickness $t_3$ of the third medium 13 (amorphous silicon) was set to 1 nm. For facilitating comparison with blackbody radiation, the vertical axis of FIG. 2A is of logarithmic scale. As is understood from FIG. 2A, evanescent p-polarization provides heat flux whose intensity greatly exceeds that of heat flux provided by blackbody radiation.

Figure 2B:
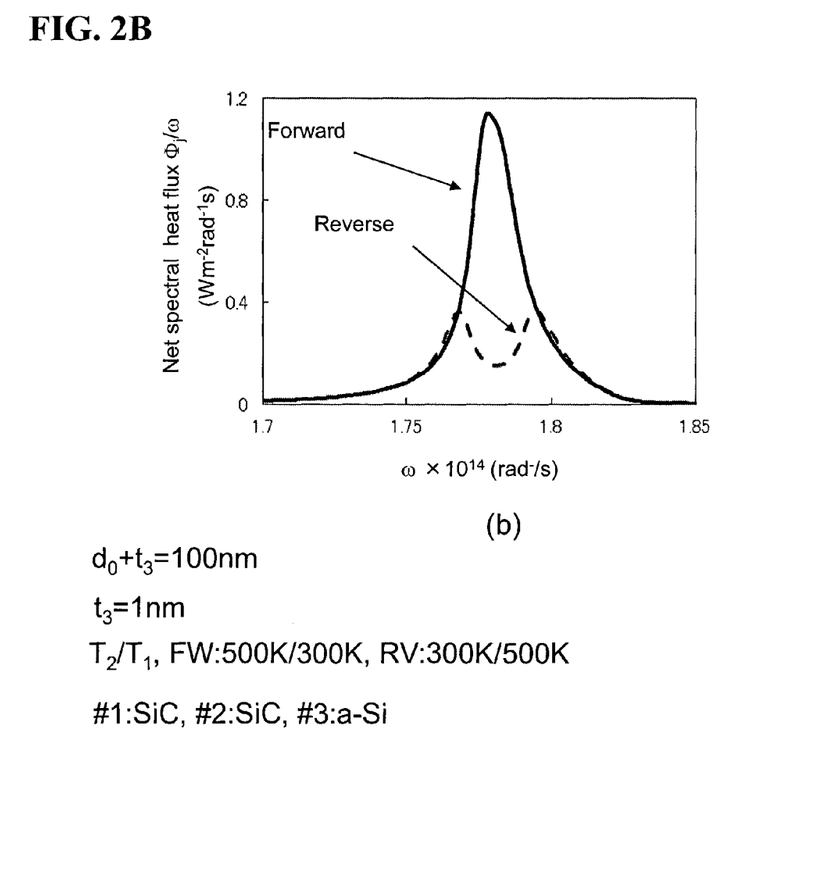
FIG. 2B is a characteristic diagram showing the heat flux spectra of the heat rectification device of the first embodiment in the forward and reverse biased states.

FIG. 2B shows heat flux spectra in the forward biased state and the reverse biased state. As is understood from FIG. 2B, in the forward biased state, the heat flux spectrum has a peak at the wavelength of 10.6 μm and, in the reverse biased state, heat flux decays at the position of the peak.

Let us obtain conditions for generation of a forward heat flux peak. With $(\varepsilon_3)^{1/2}\omega/c$ being sufficiently smaller than $\beta$, the imaginary part of the second term, the third term, and the fourth term of Eq. (4) become sufficiently small as compared with the real part of the second term of Eq. (4). Therefore, Eq. (4) can be approximated as follows.

[Math. 10]

$$D_{ee}(T_L)\sim 1-\text{Re}(r_{31,p}(T_L)r_{30,p}\exp(-2k_m t_3)) \quad (10)$$

The following conditions for maximizing the forward heat flux given by Eq. (8) are obtained by replacing the differential with respect to the thickness $t_3$ of the third medium in Eq. (8) with zero.

[Math. 11]

$$1 - \text{Re}(r_{31,p}(T_L))r_{30,p}\exp(-2\kappa_m t_3) = 0 \quad (11)$$

[Math. 12]

$$1 - \text{Re}\left(\frac{\varepsilon_1 - \varepsilon_3}{\varepsilon_1 + \varepsilon_3}\right)\frac{1 - \varepsilon_3}{1 + \varepsilon_3}\exp(-2\kappa_m t_3) = 0 \quad (12)$$

Eq. (12) is solved, thereby yielding Eq. (1) mentioned above.

The rectification coefficient is defined as follows.

[Math. 13]

$$RF = \frac{\phi_{Forward} - \phi_{Reverse}}{\phi_{Reverse}} \quad (13)$$

Figure 3A:
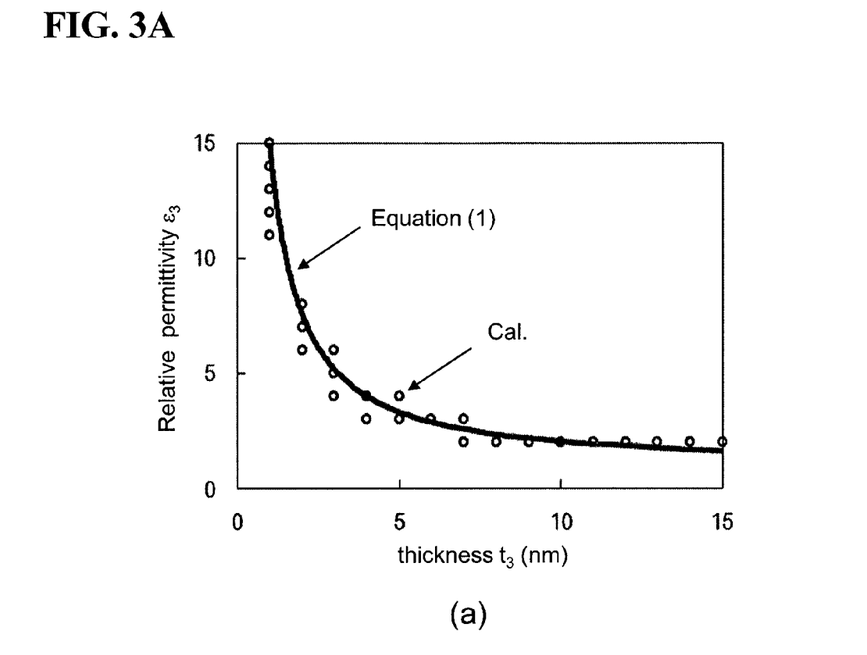
FIG. 3A is a characteristic diagram showing the relationship between the relative permittivity and the thickness of a third medium, which partially constitutes the heat rectification device of the first embodiment.
Figure 3B:
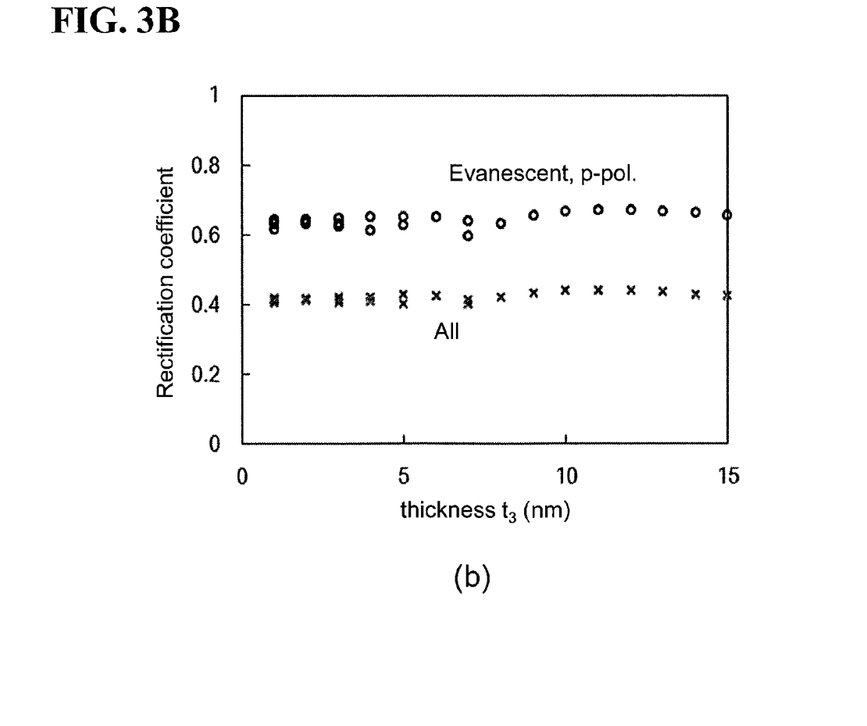
FIG. 3B is a characteristic diagram showing the relationship between the rectification coefficient and the thickness of the third medium, which partially constitutes the heat rectification device of the first embodiment.

The rectification coefficient was calculated for the case where the temperature $T_H$ was set to 500K, the temperature $T_L$ was set to 300K, and the relative permittivity $\epsilon_3$ and the thickness $t_3$ of the third medium 13 were varied. FIG. 3A shows the relationship between the thickness $t_3$ and the relative permittivity $\epsilon_3$ for the maximum rectification coefficient. FIG. 3B shows the relationship between the maximum rectification coefficient and the thickness $t_3$. As is understood from FIGS. 3A and 3B, even though the relative permittivity $\epsilon_3$ of the third medium is varied in the range of 2 to 14, by means of the thickness $t_3$ being selected appropriately according to the relative permittivity $\epsilon_3$ on the basis of the relationship of FIG. 3A, the rectification coefficient becomes constant around 0.7 as shown in FIG. 3B. Also, it is understood that Eq. (1) accurately expresses the relationship between the thickness $t_3$ and the relative permittivity $\epsilon_3$ for the maximum rectification coefficient.

Second Embodiment

Figure 4:
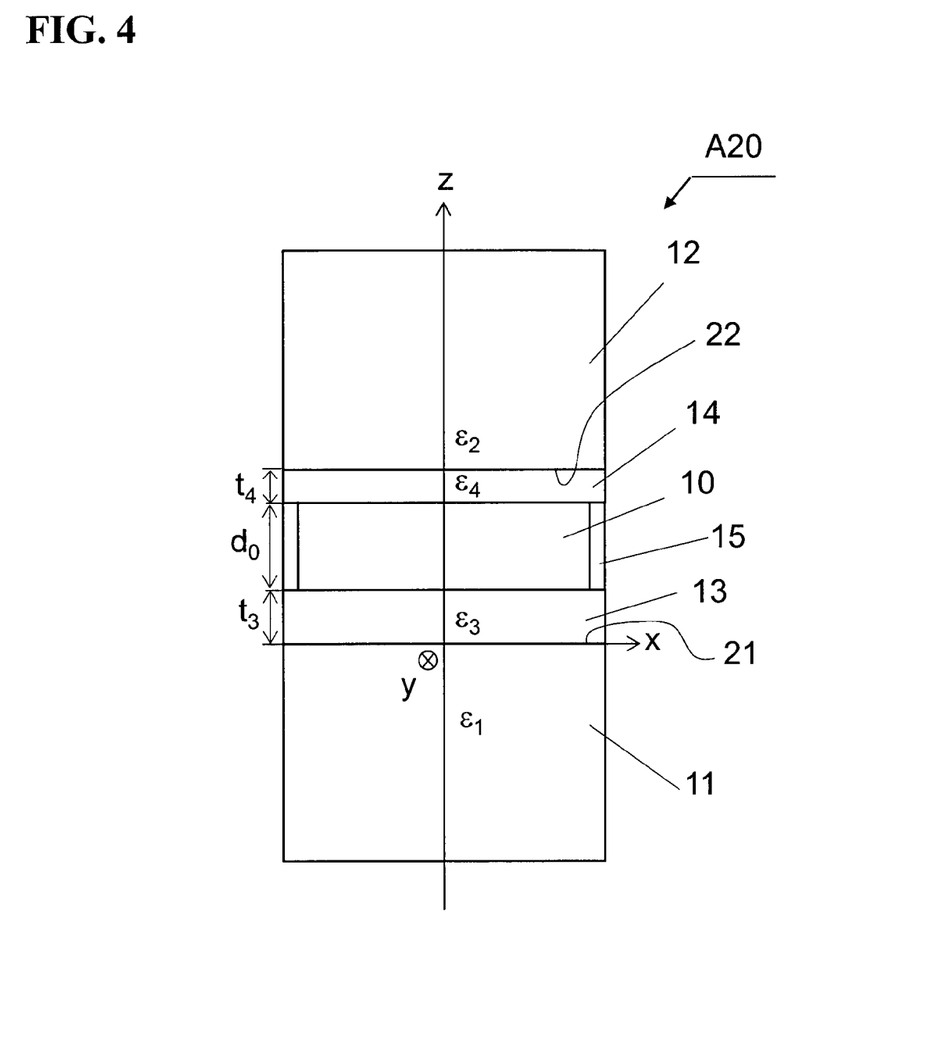
FIG. 4 is a view showing the configuration of a thermal rectification device according to a second embodiment of the present invention.

FIG. 4 shows the configuration of a thermal rectification device A20 according to a second embodiment of the present invention. In the thermal rectification device A10 of the first embodiment, only the first medium 11 is coated with amorphous silicon, thereby having the third medium 13 thereon. In the thermal rectification device A20 of the second embodiment, amorphous silicon is coated on the main surface 22 of the second medium 12 on a side toward the first medium 11, thereby forming a fourth medium 14 having a thickness different from that of the third medium 13. Configurational features identical in function with those of the first embodiment are denoted by like reference numerals or signs. The material of the fourth medium 14 may differ from that of the third medium 13 in temperature and frequency characteristics of permittivity. The employment of the configuration of the second embodiment provides a thermal rectification device whose degree of freedom of design is further improved and whose fabrication is further facilitated.

In the above embodiments, the distance d between the main surface 21 of the first medium 11 and the main surface 22 of the second medium 12 is 100 nm. However, no particular limitation is imposed on the distance d so long as evanescent waves can be efficiently coupled. This is for the following reason: when the distance d is much less than the wavelength (10.6 μm) of evanescent waves generated through excitation of surface phonon polaritons, the evanescent waves are efficiently coupled together, resulting in resonance between surface phonon polaritons on the two interfaces. For example, a distance d of 300 nm or less, 200 nm or less, 100 nm or less, or a 50 nm or less can be used.

In the present invention, the third medium 13 and the fourth medium 14 can be of, in addition to the above-mentioned material, barium fluoride ($BaF_2$), strontium fluoride ($SrF_2$), lead fluoride ($PbF_2$), calcium fluoride ($CaF_2$), rubidium bromide (RbBr), cesium bromide (CsBr), cesium chloride (CsCl), potassium chloride (KCl), or sodium chloride (NaCl), for use with a material of the first and second media 11 and 12, such as SiC or $SiO_2$, whose real part of permittivity is −1 or less in the frequency band of evanescent waves generated through thermal excitation of surface phonon polaritons.

Particularly, in the case of the first and second media 11 and 12 of SiC, desirably, the third and fourth media 13 and 14 are of barium fluoride ($BaF_2$), strontium fluoride ($SrF_2$), or calcium fluoride ($CaF_2$). In this case, forward heat flux can be increased in intensity, and the rectification coefficient can be increased.

INDUSTRIAL APPLICABILITY

The present invention can be applied to devices which require unidirectional heat flow, such as heat sinks, heat storage devices, and heat retaining devices.

The invention claimed is:

1. A thermal rectification device comprising:
   a first medium and a second medium, the first medium and the second medium being of the same material, and the first and second media being coupled via evanescent waves generated by surface phonon polaritons thermally excited on surfaces of the first and second media,
   a third medium provided on a surface of the first medium on a side toward the second medium;
   a gap formed between the second medium and the third medium for cutting off thermal conduction therebetween, heat transfer between the first and second media being performed mainly via the thermally excited evanescent waves, and the gap comprising a relative permittivity different from each relative permittivity of the second medium and the third medium;
   wherein heat flux which flows from the second medium to the first medium in a first state in which the second medium has a first temperature $T_H$ and the first medium has a second temperature $T_L$ lower than the first temperature $T_H$ differs in intensity from heat flux which flows from the first medium to the second medium in a second state in which the first medium has the first temperature $T_H$ and the second medium has the second temperature $T_L$.

2. The thermal rectification device according to claim 1, wherein a fourth medium is provided on a surface of the second medium on a side toward the first medium, the fourth medium comprising a relative permittivity different from the relative permittivity of the gap and the gap formed between the third medium and the fourth medium.

3. The thermal rectification device according to claim 1, wherein the third medium has a relative permittivity and a thickness such that
   in the first state, there exists a first frequency range in which the resonance frequency of surface phonon polaritons thermally excited at the interface between the first medium and the third medium coincides with the resonance frequency of surface phonon polaritons thermally excited on the surface of the second medium on the side toward the first medium; and
   in the second state, the first frequency range is wider than a second frequency range in which the resonance frequency of surface phonon polaritons thermally excited at the interface between the first medium and the third medium coincides with the resonance frequency of surface phonon polaritons thermally excited on the surface of the second medium or the second frequency range does not exist.

4. The thermal rectification device according to claim 2, wherein the third medium and the fourth medium have a relative permittivity and a thickness, respectively, such that
   in the first state, there exists a first frequency range in which the resonance frequency of surface phonon polaritons thermally excited at the interface between the first medium and the third medium coincides with the resonance frequency of surface phonon polaritons thermally excited at the interface between the second medium and the fourth medium; and
   in the second state, the first frequency range is wider than a second frequency range in which the resonance frequency of surface phonon polaritons thermally excited at the interface between the first medium and the third medium coincides with the resonance frequency of surface phonon polaritons thermally excited at the interface between the second medium and the fourth medium or the second frequency range does not exist.

5. The thermal rectification device according to claim 1, wherein heat flux which flows from the second medium to the first medium in the first state is larger in intensity than heat flux which flows from the first medium to the second medium in the second state.

6. The thermal rectification device according to claim 1, wherein a distance between the first medium and the second medium is 300 nm or less.

7. The thermal rectification device according to claim 1, wherein the relative permittivities of the first and second media have a real part of −1 or less as measured in a temperature range and a frequency band of the evanescent waves when heat transfer is performed via the evanescent waves.

8. The thermal rectification device according to claim 1, wherein the first medium and the second medium are at least one of silicon carbide (SiC), silicon dioxide ($SiO_2$), and silicon (Si) doped with impurities.

9. The thermal rectification device according to claim 1, wherein, when a direction in which heat flux of high intensity flows is defined as a forward direction and a direction in which heat flux of low intensity flows is defined as a reverse direction, the third medium has such a relative permittivity and thickness as to maximize heat flux of the forward direction.

10. The thermal rectification device according to claim 3, wherein, when a direction in which heat flux of high intensity flows is defined as a forward direction and a direction in which heat flux of low intensity flows is defined as a reverse direction, the third medium has such a relative permittivity and thickness as to maximize heat flux of the forward direction.

11. The thermal rectification device according to claim 2, wherein, when a direction in which heat flux of high intensity flows is defined as a forward direction and a direction in which heat flux of low intensity flows is defined as a reverse direction, the fourth medium has such a relative permittivity and thickness as to maximize heat flux of the forward direction.

12. The thermal rectification device according to claim 4, wherein, when a direction in which heat flux of high intensity flows is defined as a forward direction and a direction in which heat flux of low intensity flows is defined as a reverse direction, the fourth medium has such a relative permittivity and thickness as to maximize heat flux of the forward direction.

13. The thermal rectification device according to claim 1, wherein a thickness $t_3$ and a relative permittivity $\varepsilon_3$ of the third medium satisfy

[Math. 1]

$$t_3 = \frac{1}{2k_m} \ln \frac{(\varepsilon_3 - 1)(\varepsilon_3^2 - |\varepsilon_1|^2)}{(\varepsilon_3 + 1)|\varepsilon_3 + \varepsilon_1|^2} \quad (1)$$

where $\varepsilon_1$ is a relative permittivity of the first medium, $k_m$ is $40k_0$ to $50k_0$, $k_0 = 2\pi/\lambda_0$, and $\lambda_0$ is a wavelength of evanescent waves which maximizes heat flux in a forward direction, which is a direction in which heat flux of higher intensity flows as compared with that in the opposite direction.

14. The thermal rectification device according to claim 3, wherein a thickness $t_3$ and a relative permittivity $\varepsilon_3$ of the third medium satisfy

[Math. 1]

$$t_3 = \frac{1}{2k_m} \ln \frac{(\varepsilon_3 - 1)(\varepsilon_3^2 - |\varepsilon_1|^2)}{(\varepsilon_3 + 1)|\varepsilon_3 + \varepsilon_1|^2} \quad (1)$$

where $\varepsilon_1$ is a relative permittivity of the first medium, $k_m$ is $40k_0$ to $50k_0$, $k_0 = 2\pi/\lambda_0$, and $\lambda_0$ is a wavelength of evanescent waves which maximizes heat flux in a forward direction, which is a direction in which heat flux of higher intensity flows as compared with that in the opposite direction.

15. The thermal rectification device according to claim 1, wherein the third medium is amorphous silicon and has a thickness $t_3$ of 1 nm to 2 nm.

16. The thermal rectification device according to claim 2, wherein the third medium is amorphous silicon and has a thickness $t_3$ of 1 nm to 2 nm.

17. The thermal rectification device according to claim 1, wherein the third medium is a material having a relative permittivity of 1.5 to 2.5 and has a thickness $t_3$ of 5 nm to 20 nm.

18. The thermal rectification device according to claim 2, wherein the third medium is a material having a relative permittivity of 1.5 to 2.5 and has a thickness $t_3$ of 5 nm to 20 nm.

19. The thermal rectification device according to claim 1, wherein the third medium is at least one selected from the group consisting of barium fluoride ($BaF_2$), strontium fluoride ($SrF_2$), lead fluoride ($PbF_2$), calcium fluoride ($CaF_2$), rubidium bromide (RbBr), cesium bromide (CsBr), cesium chloride (CsCl), potassium chloride (KCl), and sodium chloride (NaCl).

20. The thermal rectification device according to claim 2, wherein the fourth medium is at least one selected from the group consisting of barium fluoride ($BaF_2$), strontium fluoride ($SrF_2$), lead fluoride ($PbF_2$), calcium fluoride ($CaF_2$), rubidium bromide (RbBr), cesium bromide (CsBr), cesium chloride (CsCl), potassium chloride (KCl), and sodium chloride (NaCl).

* * * * *